United States Patent [19]

Nakamatsu

[11] 4,395,447
[45] Jul. 26, 1983

[54] MEDIUM FOR RECORDING

[76] Inventor: Yoshiro Nakamatsu, 1-10-309, Minami Aoyama 5-chome, Minato-ku, Tokyo, Japan

[21] Appl. No.: 256,316

[22] Filed: Apr. 22, 1981

[30] Foreign Application Priority Data

May 8, 1980 [JP] Japan .................................. 55-59984

[51] Int. Cl.³ .............................................. B32B 3/02
[52] U.S. Cl. ........................................ 428/66; 427/48; 427/128; 427/284; 427/287; 428/64; 428/65; 428/172; 428/694; 428/900
[58] Field of Search .................... 427/48; 428/900, 64, 428/65, 66, 694, 172

[56] References Cited

U.S. PATENT DOCUMENTS 4,001,463  1/1977  Schaefer et al. ..................... 427/48
4,271,782  6/1981  Bate et al. .......................... 427/48 X Primary Examiner—Bernard D. Pianalto
Attorney, Agent, or Firm—Andrus, Sceales, Starke & Sawall

[57] ABSTRACT

A video disc includes a magnetic material applied thereon in such a manner that the orientation of said magnetic material is gradually intensified from the outermost track of the video disc to the innermost track thereof, starting from zero orientation at the outermost track.

3 Claims, 16 Drawing Figures

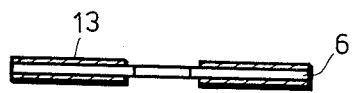
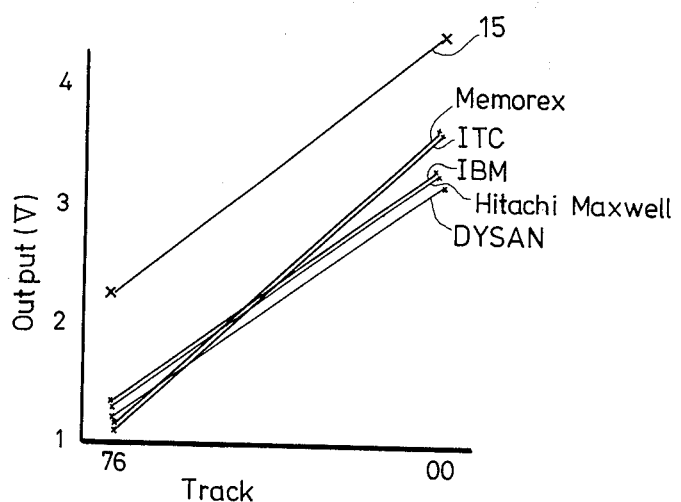
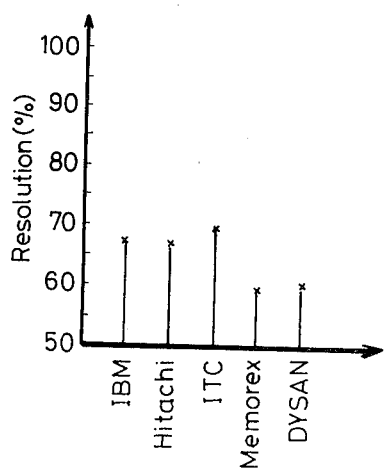
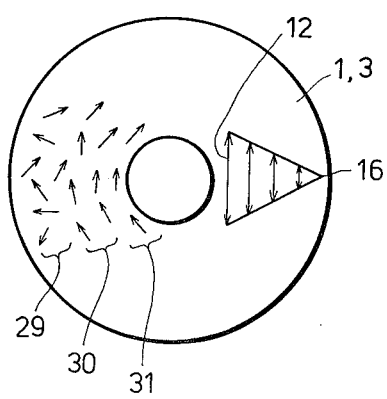

MEDIUM FOR RECORDING

This invention relates to an improved recording medium such as a magnetic disc or the like.

It is an object of this invention to provide an improved recording medium which has an averaged output and a resolution better than the prior art.

This invention as well as the prior art will now be described with reference to the accompanying drawings in which:

BRIEF DESCRIPTION OF THE DRAWING

FIG. 7 is a cross-sectional view of a disc on which a magnetic material is uniformly coated;

FIG. 8 is a cross-sectional view of a disc on which a magnetic material is centrifugally coated;

FIG. 9 is a graph showing the outputs of the tracks in the prior art diskettes commercially available from various manufacturers;

FIG. 10 is a graph showing the resolution on the seventy-sixth track in each of the prior art diskettes;

FIG. 11 is a plan view showing the principle of this invention;

DETAILED DESCRIPTION OF THE DRAWING

Figure 1:
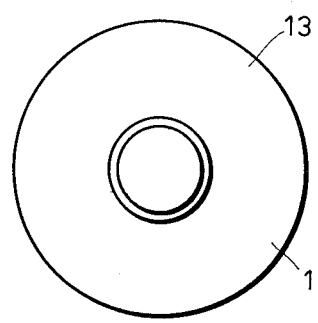
FIG. 1 is a plan view of a magnetic disc according to the prior art.
Figure 2:
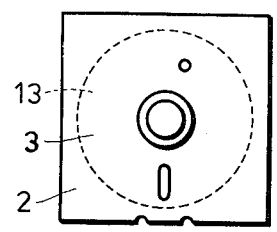
FIG. 2 is a plan view of another magnetic disc according to the prior art.

Magnetic discs includes two types of discs, a hard disc of aluminium or the like which has a face 1 coated with a film-like magnetic material 13 such as $\gamma$-$Fe_2O_3$ or the like as shown in FIG. 1 and a so-called diskette or floppy disc as shown in FIG. 2 which comprises a circular plate 3 of soft polyester coated with a film-like magnetic material such as $\gamma$-$Fe_2O_3$ or the like and a soft plastic jacket 2 receiving the circular plate therein.

Figure 3:
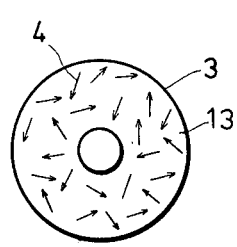
FIGS. 3 and 4 illustrate the orientation of the magnetic material in the prior art magnetic discs.
Figure 4:
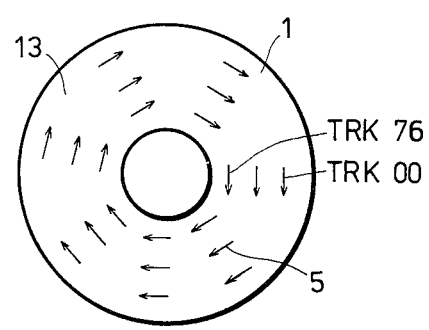
Figure 5:
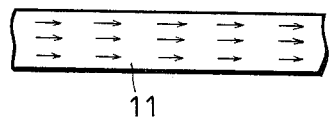
FIG. 5 illustrates the orientation of the magnetic material in the prior art magnetic tape.

As shown in FIG. 3, the prior art diskette 3 stamped out from a magnetic tape has no orientation in the magnetic material 4. On the other hand, a rigid disc 1 in the prior art has an orientation of the magnetic material 5 which is uniform over the whole width thereof in one direction as shown in FIG. 4. Furthermore, the prior art magnetic tape 11 has an orientation which is uniform along the width and length thereof as shown in FIG. 5.

Figure 6:
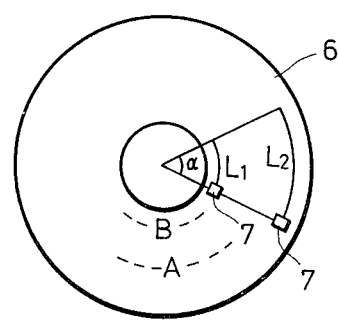
FIG. 6 is a view showing a relationship between a disc and a head for illustrating this invention.

As can be seen from FIG. 6, a head 7 runs on the face of a disc 6 within a distance $L_1$ at the inner periphery of the disc and within a distance $L_2$ at the outer periphery thereof at an invariable angular velocity. Apparently, the distance $L_1$ is smaller than the distance $L_2$ so that the relative velocity between the head and disc will be gradually reduced toward the inner periphery of the disc to decrease the output.

With respect to the resolution, a recording density (BPI) in the inner periphery of the disc must be higher than that in the outer periphery thereof for obtaining an invariable memory capacity. For example, the recording density is 7,000 BPI at a middle area A in the disc but 13,000 BPI at an inner periphery B in the same.

Consequently, the resolution must be gradually increased toward the inner periphery of the disc.

Thus, it is not preferred that the disc has a coating 13 of magnetic material which is uniform in thickness over the faces thereof as shown in FIG. 7. Rather, it is preferred that the magnetic coating 14 is thinned from the outer periphery of the disc to the inner periphery thereof, as in FIG. 8, to provide a higher recording density (BPI) or a better resolution at the inner periphery of the disc. In such a case, however, the output in the inner periphery may be reduced since the coating on the inner periphery is thinner than that on the outer periphery.

This invention intends to overcome the above problems in the prior art.

In the rigid discs and floppy discs (diskettes) constructed according to the prior art, the magnetic material has its irregular orientation as shown in FIG. 3. Even if the disc has a uniform orientation as shown in FIG. 4, the output is gradually decreased from the outer periphery of the disc to the inner periphery thereof.

Table 1 represents preformances in various diskettes commercially available from the existent manufacturers and which have been measured actually by the inventor.

TABLE 1

| Manu-facturer | First Track (1F) | Seventy-sixth Track (2F/1F) | Reso-lution | Ratio of Output between Inner and Outer Peripheries |
|---|---|---|---|---|
| IBM 3740/2 | 3.25V | 1.30V/1.87 | 67 | 0.40 (2.50) |
| DYSAN | 3.53 | 1.09/1.85 | 59 | 0.31 (3.24) |
| Memorex Hitachi | 3.56 | 1.12/1.95 | 58 | 0.31 (3.18) |
| Maxwell | 3.10 | 1.17/1.78 | 66 | 0.38 (2.65) |
| ITC | 3.27 | 1.29/1.87 | 69 | 0.39 (2.53) |

The measurements in Table 1 are represented by a graph of FIG. 9. As shown by 15 in FIG. 9, the disc of FIG. 4 has its output which increases from the outer periphery of the disc to the inner periphery thereof. However, there is still a large difference between the outputs in the inner and outer peripheries of the disc. As can be seen from Table 1 and FIG. 10, the resolution at the inner periphery represents a low value in the range of 58% to 69%.

This invention eliminates such disadvantages in the prior art and can be applied to all of recording media such as rigid discs, flexible discs, magnetic tapes and others.

Essentially, this invention provides a recording medium having a magnetic orientation varied in such a manner that it is intensified, attenuated and nullified in various different areas on the medium.

Figure 12:
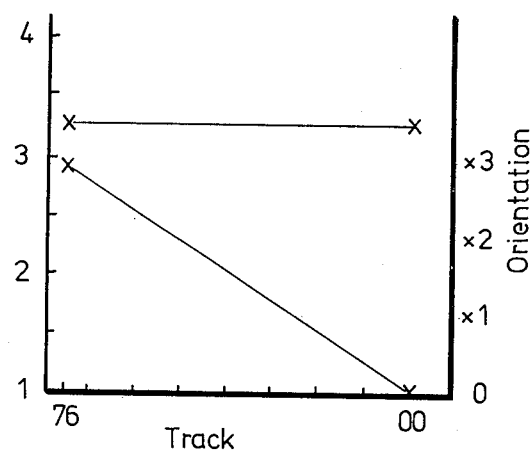
FIG. 12 is a graph showing a variation in orientation and a distribution of output in a disc according to this invention.
Figure 13:
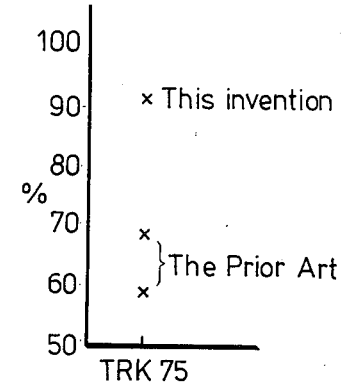
FIG. 13 is a graph showing the resolutions of magnetic discs according to this invention and the prior art in comparison.

In accordance with this invention, as shown in FIG. 11, the magnetic material on the disc 1 or the diskette 3 has the most intensified orientation at the inner periphery thereof. The magnetic orientation is gradually attenuated toward the outer periphery of the disc or diskette and finally nullified at the outermost periphery thereof as shown by 16. In other words, the individual magnetic particles are irregularly oriented at or adjacent to the outermost area 29 of the disc, completely uniformly oriented at or adjacent to the innermost area 31, and relatively regularly oriented in the middle area 30. Thus, the differences in the relative velocity and material thickness as shown in FIGS. 6 and 8 can be rectified by the difference in the magnetic orientation to average the outputs between the inner and outer peripheries of the disc. Namely, the output distribution in the whole disc can be shown by a straight line as shown in FIG. 12. FIG. 12 also shows variations in orientation relative to the tracks in the disc. It is apparent that the disc according to this invention is remarkably improved with respect to the whole output thereof in comparision with the prior art. Furthermore, the resolution at the innermost periphery, that is, the seventy-sixth track of the diskette according to this invention can be increased up to 90% as shown in FIG. 13. This means that the disc is also remarkably improved with respect to the resolution in comparison with the prior art discs shown in FIG. 10.

Figure 14:
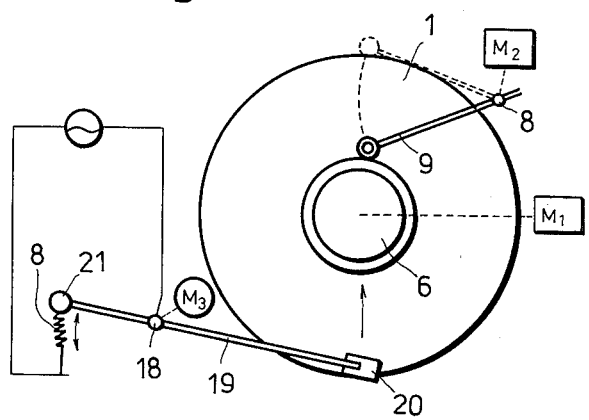
FIG. 14 is a plan view of a coating device for making magnetic discs in accordance with this invention.
Figure 15:
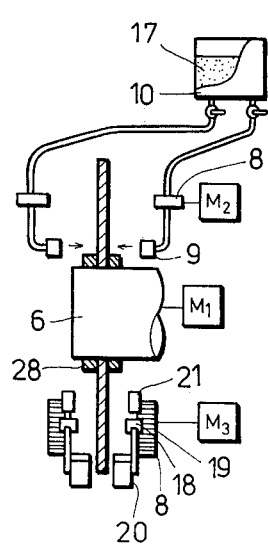
FIG. 15 is a side elevational view of the coating device shown in FIG. 14.

This invention can be carried out, for example, by the following process. As shown in FIGS. 14 and 15, a disc 1 of aluminium or polyester is mounted on a rotating shaft 6 by means of a clamp 28. As the disc is rotated, a magnetic composition 17 in a tank 10 is applied to the disc from the outer periphery to the inner periphery thereof through nozzle pipes 9 which are swingable around the respective shafts 8. Under the centrifugal force, the magnetic composition is applied to form a coating which is decreased in thickness toward the inner periphery of the disc as shown in FIG. 8. Subsequently, a magnetizing device (coiled magnet) 20, which is mounted on the tip of an arm 19 swingable around a rotating shaft 18, is moved from the outer periphery of the disc 1 to the inner periphery thereof. The arm 19 has a contact shoe 21 mounted on the opposite end of the arm. The contact shoe 21 is adapted to slide on an arcuate resistor winding 8 so that the resistance will be varied as the arm 19 is swung. When the magnetizing device 20 is on the outermost periphery of the disc or diskette 1 as shown in FIG. 14, the resistance in the resistor 8 is increased to the maximum so that the magnetizing device cannot be energized to orient the magnetic material on the disc. As the magnetizing device 20 is being moved to the inner periphery of the disc or diskette 1, the electric resistance in the resistor 8 is gradually decreased to intensify the orientation of the magnetic material on the disc.

Thus, the magnetic orientation is nullified at the first track in the outer periphery of the disc, gradually intensified toward the inner periphery thereof, and finally maximized at the seventy-sixth track of the disc (in case of a diskette 3740/2). Thus, the obtained disc has the whole output which is constant from the first track to the seventy-sixth track as shown in FIG. 12.

The coating machine shown in FIGS. 14 and 15 includes motors $M_1$, $M_2$ and $M_3$ which are operably linked together. These motors are not described herein in detail since such an arrangement are well known in the art.

This invention provides a recording disc generating the whole output which is constant from the inner periphery to the outer periphery of the disc and having a magnetic coating which can be gradually thinned toward the inner periphery of the disc to increase the resolution thereat. This invention also provides a coating machine which is simplified without any complicated electric circuit. In addition, this invention increases the whole resolution of the disc to improve the recording density and the packing density.

Figure 16:
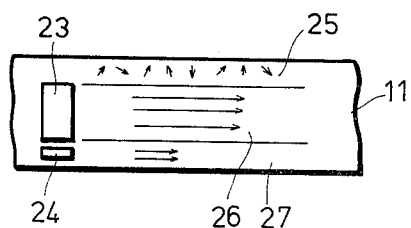
FIG. 16 is a plan view of a magnetic tape according to this invention.

FIG. 16 shows a magnetic tape 11 to which this invention is applied. In this embodiment, two magnetizing devices 23 and 24 are provided to nullify the magnetic orientation at an audio track 25, to give a control track 27 a relatively attenuated orientation in the magnetic field and to intensify the magnetic orientation at a video track 26. Thus, the video track 26 genetates an output larger than those of the audio and control tracks 25 and 27. This magnetic tape is best suitable for a linear type video tape recorder. However, if the video track 26 has its attenuated magnetic orientation, that magnetic tape would be best suitable for a helical scan type video tape recorder.

Although this invention has been described with respect to the coating technique, various modifications and changes thereof can be made within the scope of the invention. For example, the disc may be covered with $\gamma$-$Fe_2O_3$ by the use of a spattering technique.

I claim:
1. A recording medium comprising:
    (a) a recording disc,
    (b) a magnetic coating on said disc and with said coating having a thickness which decreases from a maximum to a minimum radially inwardly from the outer periphery toward the center of said disc to provide correspondingly increasing recording density from the outer periphery toward the center of said disc, said coating containing magnetic particles,
    (c) said magnetic particles being oriented relative to the surface of said disc generally inversely to the change in thickness of said coating and being essentially non-oriented at the periphery of said disc in the area of maximum coating thickness and increasing in orientation radially inwardly toward the center of said disc to a maximum uniform orientation in the area of minimum coating thickness, to thereby provide an essentially constant output for the recording medium from the disc periphery radially inwardly to the inner termination of said magnetic coating.
2. The recording medium of claim 1 wherein the resolution thereof adjacent the area of minimum coating thickness and maximum uniform orientation is about 90%.
3. In the manufacture of a recording medium comprising a recording disc provided with a magnetic coating on said disc and with said coating containing magnetic particles, the steps of:
    (a) coating said disc with said magnetic coating so that the latter has a thickness which decreases from a maximum to a minimum radially inwardly from the outer periphery toward the center of said disc to provide correspondingly increasing recording density from the outer periphery toward the center of said disc,
    (b) and causing said magnetic particles on said coated disc to be oriented relative to the surface of said disc generally inversely to the change in thickness of said coating so that said particles are essentially non-oriented at the periphery of said disc in the area of maximum coating thickness and increase in orientation radially inwardly toward the center of said disc to a maximum uniform orientation in the area of minimum coating thickness to provide a recording medium having an essentially constant output from the disc periphery radially inwardly to the inner termination of said magnetic coating.

* * * * *